(12) United States Patent
Yang et al.

(10) Patent No.: US 11,758,515 B2
(45) Date of Patent: Sep. 12, 2023

(54) OPTIMIZED USER EQUIPMENT NETWORK ACCESS SELECTION

(71) Applicant: Verizon Patent and Licensing Inc., Basking Ridge, NJ (US)

(72) Inventors: Jin Yang, Orinda, CA (US); Arda Aksu, Lafayette, CA (US); Lalit R. Kotecha, San Ramon, CA (US); Vishwanath Ramamurthi, San Ramon, CA (US); Donna L. Polehn, Mercer Island, WA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 213 days.

(21) Appl. No.: 17/136,463

(22) Filed: Dec. 29, 2020

(65) Prior Publication Data
US 2022/0210767 A1 Jun. 30, 2022

(51) Int. Cl.
*H04W 72/02* (2009.01)
*H04W 72/51* (2023.01)
*H04W 72/542* (2023.01)
*H04W 48/18* (2009.01)

(52) U.S. Cl.
CPC .......... *H04W 72/02* (2013.01); *H04W 72/51* (2023.01); *H04W 72/542* (2023.01); *H04W 48/18* (2013.01)

(58) Field of Classification Search
CPC . H04W 72/02; H04W 72/048; H04W 72/085; H04W 48/18; H04W 76/10; H04W 88/02
See application file for complete search history.

(56) References Cited

U.S. PATENT DOCUMENTS

| 10,320,655 B1* | 6/2019 | Asveren ................ H04L 45/306 |
| 2010/0150120 A1* | 6/2010 | Schlicht .................. H04W 4/23 370/338 |
| 2013/0244723 A1* | 9/2013 | Yerrabommanahalli .................... H04W 48/18 455/552.1 |
| 2014/0080539 A1* | 3/2014 | Scherzer ............... H04W 72/02 455/525 |

(Continued)

FOREIGN PATENT DOCUMENTS

CN 106713290 A * 5/2017 ........... H04L 63/302

OTHER PUBLICATIONS

Lee et al., "A method and server for identifying the primary user account number", May 24, 2017, CN, CN 106713290, English language translation. (Year: 2017).*

*Primary Examiner* — Michael K Phillips

(57) ABSTRACT

A method and device is disclosed to select a network access link for an application in a user equipment (UE) device to use for communicating with a network. The method may include determining a plurality of network access links associated with the UE device and determining one or more criteria associated with a request to access a network. The criteria may include throughput, financial cost, latency, or signal strength. The method may include determining a score for each of the plurality of network access links with respect to the criteria. The score score may be based on historical data related to the criteria. The method may include comparing the score for each of the plurality of network access links with the criteria and selecting one of the network access links for an application to use to communicate with the network.

20 Claims, 6 Drawing Sheets

(56) References Cited

U.S. PATENT DOCUMENTS

| | | | | |
|---|---|---|---|---|
| 2014/0226562 A1* | 8/2014 | Shah | .................... | H04W 76/25 |
| | | | | 370/328 |
| 2015/0215832 A1* | 7/2015 | Fitzpatrick | ............ | H04W 48/14 |
| | | | | 455/426.1 |
| 2015/0375113 A1* | 12/2015 | Justice | ................. | G06F 9/5027 |
| | | | | 463/42 |
| 2017/0150470 A1* | 5/2017 | Kalapatapu | ....... | H04W 28/0226 |
| 2018/0152848 A1* | 5/2018 | Egner | ................. | H04W 76/18 |
| 2018/0184330 A1* | 6/2018 | Egner | ................. | H04L 43/0876 |
| 2019/0036828 A1* | 1/2019 | Bajaj | .................... | H04L 45/302 |
| 2019/0334820 A1* | 10/2019 | Zhao | ....................... | H04L 45/70 |
| 2020/0413111 A1* | 12/2020 | Varadarajan | ........... | H04N 21/84 |
| 2022/0007438 A1* | 1/2022 | Agrawal | ............. | H04B 17/318 |

* cited by examiner

OPTIMIZED USER EQUIPMENT NETWORK ACCESS SELECTION

BACKGROUND

User devices may access a network through different access links, such as through WiFi networks, Fifth Generation (5G) wireless networks (e.g., 5G New Radio (NR) networks), wired networks (e.g., cable or fiber), macrocells, small cells, etc. Each access link may have advantages or disadvantages as measured by resource usage, latency, and/or throughput, for example.

DETAILED DESCRIPTION OF EXAMPLE EMBODIMENTS

The following detailed description refers to the accompanying drawings. The same reference numbers in different drawings may identify the same or similar elements. Also, the following detailed description does not limit the invention.

Methods disclosed below allow applications running on user equipment to select network access links based on various criteria or requirements, such as latency or throughput among other things. Different applications running in the user equipment may select different network access links based on the specific needs of the application. For example, one application may use a network access link with low latency and low throughput while, simultaneously, another application may use a network access link with high latency and high throughput. In some implementations, a single application may use multiple separate connections for different needs (e.g., one connection for low latency needs, another connection for throughput).

Figure 1:
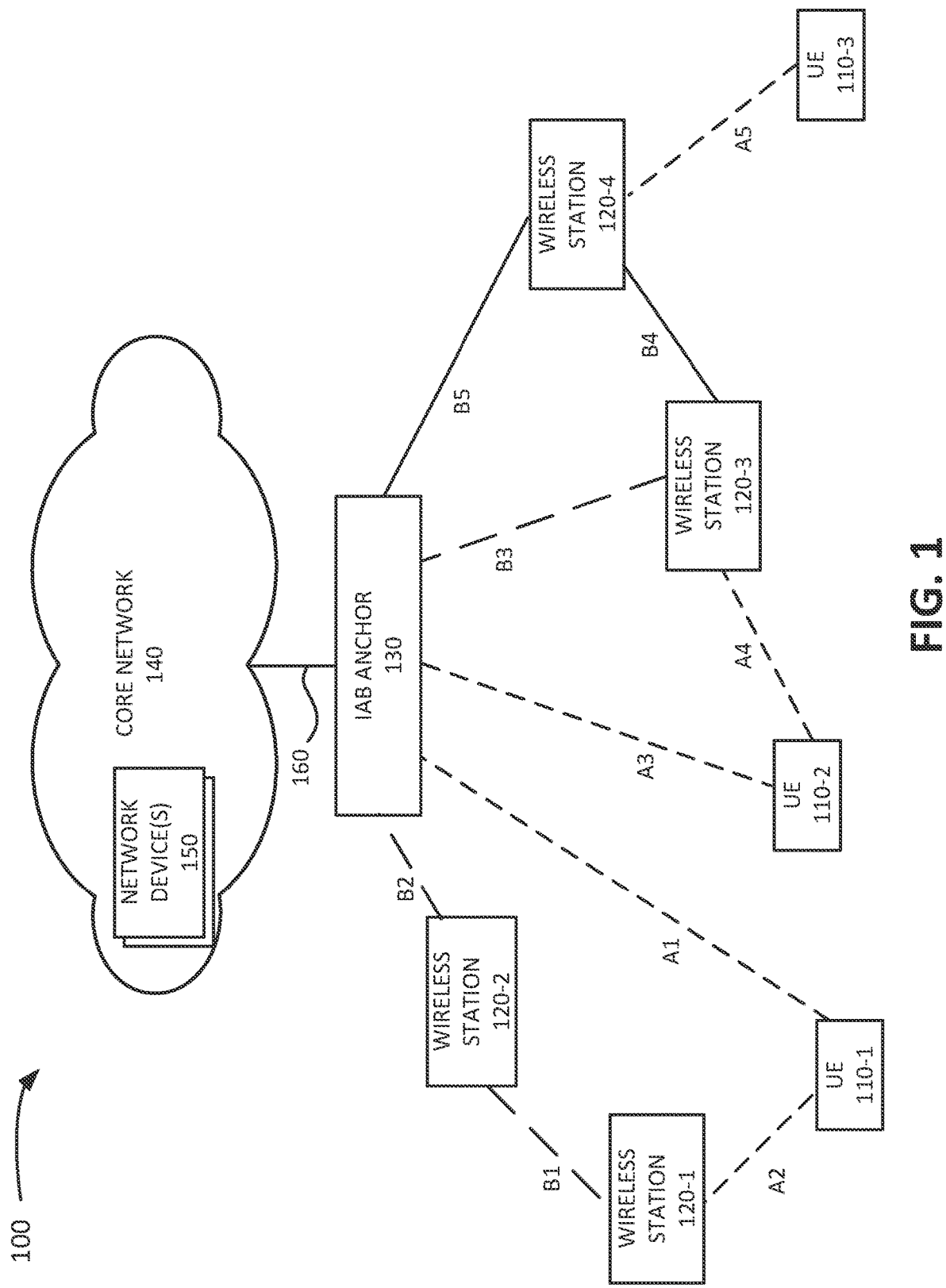
FIG. 1 is a block diagram of an exemplary environment in which systems and methods described herein may be implemented.

FIG. 1 is a diagram illustrating an exemplary environment 100 in which systems and methods described herein may be implemented. Referring to FIG. 1, environment 100 may include user equipment (UE) devices 110-1 through 110-3 (referred to individually as UE device 110 and collectively as UE devices 110), wireless stations 120-1 through 120-4 (referring to individually as wireless station 120 and collectively as wireless stations 120), integrated access and backhaul (IAB) anchor 130, core network 140, network devices 150, and a link 160. The dashed lines A1-A4 represent wireless network access links from UE devices 110. Dashed lines B1-B3 represent wireless backhaul links from wireless stations 120 to other devices such as IAB anchor 130. Solid lines B4 and B5 represent wired backhaul links from wireless stations 120 to other devices such as IAB anchor 130.

UE device 110 may include a mobile device, such as a wireless or cellular telephone device (e.g., a conventional cell phone with data processing capabilities), a smart phone, a personal digital assistant (PDA) that can include a radiotelephone, etc. In another implementation, UE device 110 may include any type of mobile or fixed computer device or system, such as a personal computer (PC), a laptop, a tablet computer, a notebook, a netbook, a wearable computer (e.g., a wrist watch, eyeglasses, etc.), a game playing device, a music playing device, etc. In other implementations, UE device 110 may be implemented as a machine-type communications (MTC) device, an Internet of Things (IoT) device, a machine-to-machine (M2M) device, etc., that includes communication functionality, such as a home appliance device, a home monitoring device, a camera, etc. UE device 110 may wirelessly connect to wireless stations 120.

In an exemplary implementation, UE devices 110 may use wireless channels to communicate with wireless stations 120. The wireless channels may correspond, for example, to a physical layer in accordance with different radio access technology (RAT) types. Wireless channels may correspond to a physical layer associated with Fifth Generation (5G) New Radio (NR) standards. In other implementations, the wireless channels may correspond to physical layers associated with Fourth Generation (4G), 4.5G or other air interfaces. In an exemplary implementation, UE devices 110 may be 5G-capable devices that provide voice communication, mobile broadband services (e.g., video streaming, real-time gaming, high-speed Internet access etc.), best effort data traffic, and/or other types of applications via a 5G NR service using, for example, millimeter wave (mmWave) radio frequencies (e.g., 24.25 to 52.6 GHz) or other radio frequencies (e.g., sub-6 GHz including 5 to 30 MHz and 410 to 7125 MHz).

Wireless stations 120 (sometimes referred to as base stations, relays, or IAB nodes) may each include a network device that has computational and wireless communication capabilities. Wireless stations 120 may each include a transceiver system that connects UE device 110 to other components of a radio access network (RAN) and core network 140 using wireless and/or wired interfaces. In one implementation, wireless station 120 may be a 5G capable device, such as a next generation Node B (gNodeB or gNB), configured to receive 5G communications over a RAN. In such implementations, wireless stations 120 may include one or more radio frequency (RF) transceivers (also referred to as cells and/or base station sectors) facing particular directions. For example, wireless stations 120 may include three RF transceivers and each RF transceiver may service a 120° sector of a 360° field of view. Each RF transceiver may also include an antenna array. The antenna array may include an array of controllable antenna elements configured to send and receive 5G NR wireless signals via one or more antenna beams. The antenna elements may be digitally controllable to electronically tilt, or adjust the orientation of, an antenna beam in a vertical direction and/or horizontal direction. In some implementations, the antenna elements may additionally be controllable via mechanical steering using one or more motors associated with each antenna element.

Wireless stations 120 may include an evolved Node B (eNodeB or eNB), an evolved LTE (eLTE) eNB, a gNB, a radio network controller (RNC), a remote radio head (RRH), a baseband unit (BBU), a small cell node (e.g., a picocell node, a femtocell node, a microcell node, a repeater, a relay, etc.), or another type of wireless station/node that provides wireless access to/from UE devices 110 and other wireless stations 120. Environment 100 may include a split gNB that may include multiple gNB-distributed units (DUs) connected to a gNB-centralized unit (CU) connected to core network 140. For example, the gNB-DUs may support multiple different carriers and bandwidths. As an alternative to a split gNB scenario, the system may be similarly applicable to an Option 3×, split-eNB case (e.g., via a W1 interface), or alternatively, for a connection to an evolved packet core (EPC)/5G core interworking.

The radio access network in environment 100 may include functional splitting, such as Options 1-8 that may include an EPC network and/or a NG core (NGC) network, or the splitting of the various layers (e.g., physical layer, Media Access Control (MAC) layer, Radio Link Control (RLC) layer, and Packet Data Convergence Protocol (PDCP) layer), plane splitting (e.g., user plane, control plane, etc.), CU and DU, interface splitting (e.g., F1-U, F1-C, E1, Xn-C, Xn-U, X2-C, Common Public Radio Interface (CPRI), etc.) as well as other types of services, such as dual connectivity (DC) or higher (e.g., a secondary cell group (SCG) split bearer service, a MCG split bearer, an SCG bearer service, E-UTRA-NR (EN-DC), NR-E-UTRA-DC (NE-DC), NG RAN E-UTRA-NR DC (NGEN-DC), or another type of DC (e.g., multi-radio access technology (RAT) (MR-DC), single-RAT (SR-DC), etc.), carrier aggregation (CA) (e.g., intra-band, inter-band, contiguous, non-contiguous, etc.), network slicing, coordinated multipoint (CoMP), various duplex systems (e.g., frequency division duplex (FDD), time division duplex (TDD), half-duplex FDD (H-FDD), etc.), and/or another type of connectivity service (e.g., NSA) (e.g., non-standalone NR, non-standalone E-UTRA, etc.), SA (e.g., standalone NR or standalone E-UTRA)).

Wireless stations 120 may be configured to communicate in environment 100 in a hop-by-hop manner until reaching IAB anchor 130. For example, wireless stations 120 may be part of a RAN connecting UE devices 110 to IAB anchor 130. Wireless stations 120 may forward data received from UE devices 110, as well as data received from other wireless stations 120 to IAB anchor 130. Wireless stations 120 may communicate with each other over wireless channels and/or wired channels. For example, in some instances, one or more wireless stations 120 may be configured to communicate via wired connections, such as fiber optic cables. In such implementations, wireless stations 120 may use wired connections to communicate with other wireless stations 120 when wireless communications are not available (e.g., a line of sight is not available between wireless stations 120). While some wireless stations 120 (e.g., an IAB node) may communicate with core network 140 by reaching IAB anchor 130 in a hop-by-hop manner, in other embodiments, wireless stations 120 (e.g., regular eNBs or gNBs) may communicate directly to core network 140 using a wired and backhaul.

IAB anchor 130, also referred to as an IAB donor 130 or anchor station, may include one or more computing devices or systems that are part of a wireless station that acts as an interface between the RAN associated with UE devices 110 and wireless stations 120, and core network 140. The term "IAB anchor 130" or "anchor station 130" includes any base station that aggregates data from wireless stations 120 and/or UE devices 110 and connects to core network 140 via a wired connection 160, such as via a fiber connection. In an exemplary implementation, IAB anchor 130 may include some similar elements/components as wireless stations 120. For example, IAB anchor 130 may include one or more RF transceivers facing particular directions, such as three RF transceivers and each RF transceiver may service a 120° sector of a 360° field of view. Each RF transceiver may also include an antenna array that includes an array of controllable antenna elements configured to send and receive 5G NR wireless signals via one or more antenna beams. As with links 120, antenna elements in IAB anchor 130 may be digitally controllable to electronically steer an antenna beam vertically or horizontally. In some implementations, the antenna elements may additionally be controllable via mechanical steering using one or more motors. IAB anchor 130 may also connect to core network 140 via link 160. In an exemplary implementation, link 160 may be a fiber optic link. In one embodiment, IAB anchor 130 may have a split architecture with CU and DU functionality.

Core network 140 may include one or more wired, wireless and/or optical networks that are capable of receiving and transmitting data, voice and/or video signals. For example, core network 140 may include a local area network (LAN), a wide area network (WAN), a metropolitan area network (MAN), an optical network, a cable television network, a satellite network, a wireless network (e.g., a code division multiple access (CDMA) network, a general packet radio service (GPRS) network), an ad hoc network, a telephone network (e.g., the Public Switched Telephone Network (PSTN) or a cellular network), an intranet, the Internet or a combination of networks capable of transmitting data. In one implementation, core network 140 provides packet-switched services and wireless Internet protocol (IP) connectivity to different components in environment 100, such as UE devices 110, to provide, for example, data, voice, and/or multimedia services. In some implementations, core network 140 may include a network for delivering data (e.g., multimedia services) between UE device 110 and an external network (such as another LAN, WAN, MAN, ad hoc network, etc.).

According to an exemplary implementation, core network 140 may include a core 5G NR network. In such an implementation, core network 140 may include network devices 150 that implement or host network functions, such as a user plane function (UPF), a session management function (SMF), a core access and mobility management function (AMF), a unified data management (UDM), policy control function (PCF), an authentication server function (AUSF), a network slice selection function (NSSF), as well as other network elements associated with billing, security, authentication and authorization, network policies, subscriber profiles, network slicing. In other implementations, core network 140 may include a 4G core network.

The exemplary configuration illustrated in FIG. 1 is provided for simplicity. Environment 100 may include more or fewer devices than illustrated in FIG. 1. For example, environment 100 may include a large number (e.g., hundreds or more) of UE devices 110, wireless stations 120 and IAB anchors 130, as well as multiple core networks 140. In addition, environment 100 may include additional elements, such as switches, gateways, routers, monitoring devices, etc., that aid in routing data to/from UE devices 110.

Functions are described below as being performed by particular components in environment 100. In other implementations, functions described as being performed by one device may be performed by another device or multiple other devices, and/or functions described as being performed by multiple devices may be combined and performed by a single device.

Figure 2:
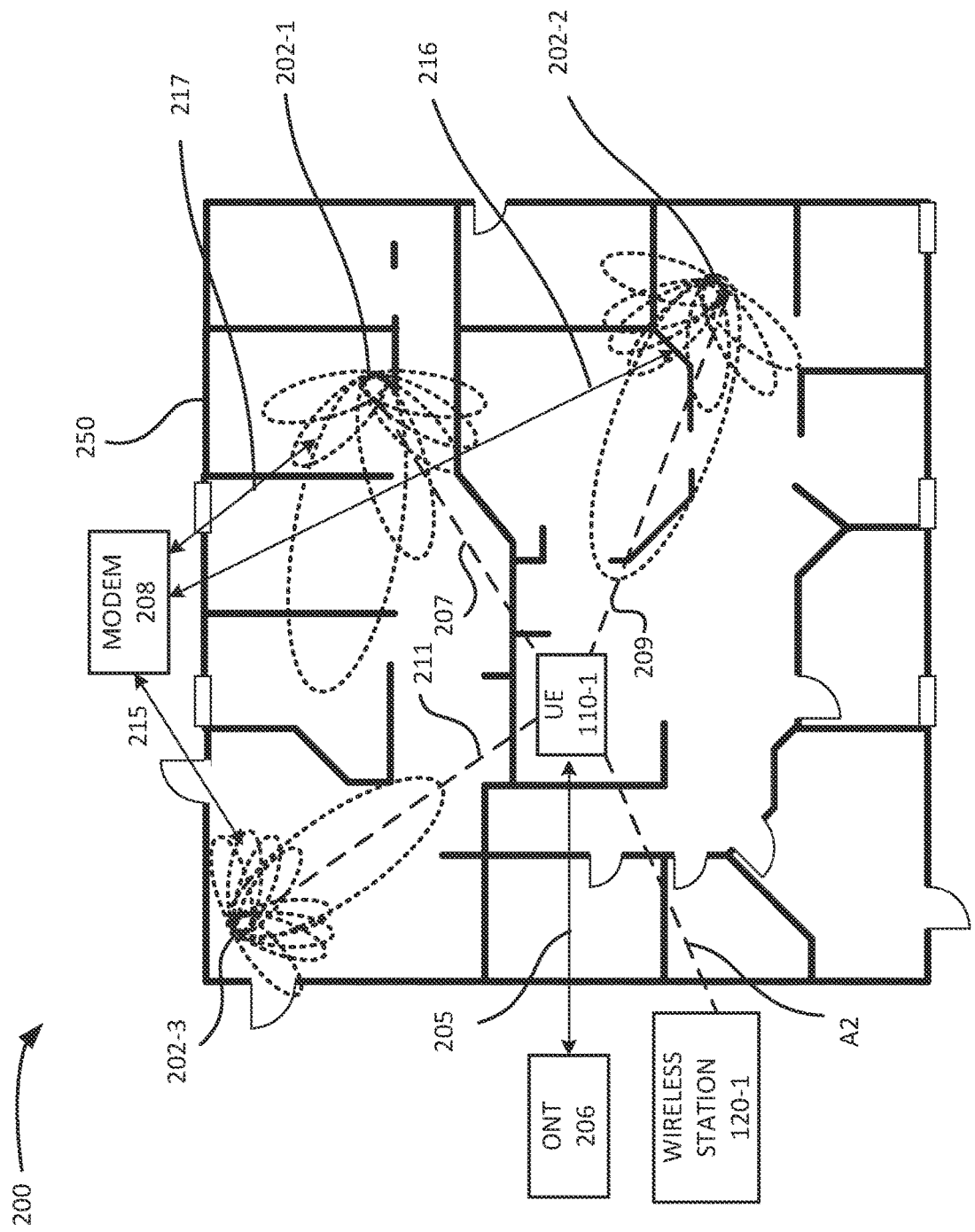
FIG. 2 is a block diagram of another exemplary environment in which systems and methods described herein may be implemented.

FIG. 2 is a diagram illustrating an exemplary environment 200 in one embodiment. Environment 200 may exist within environment 100 (shown in FIG. 1) and may include wireless station 120-1 and UE device 110-1 (also shown in FIG.

1). Environment 100 includes a customer premises 250 (e.g., an indoor environment) with three access points (APs) 202-1, 202-2, and 202-3 (individually AP 202 and collectively APs 202), walls 204, and an optical network terminal ONT 206.

ONT 206 may receive data, e.g., on a fiber optic cable, and may transmit data to the appropriate device in customer premises 250 (e.g., over link 205). Likewise, ONT 206 may receive data from any device in customer premises 250 (e.g., over link 205) and may transmit the data to other devices, e.g., through a fiber optic cable. ONT 206 may provide customer premises 250 with Internet access through a connection (not shown in FIG. 2) to core network 140, television access, telephone service, etc. Other technologies may be used to provide consumer premises 250 with Internet access, access to core network 140, television access, and/or telephone service. For example, ONT 206 may alternatively or additionally include a modem that transmits and receives data using a coaxial cable and a standard such as the Data Over Cable Services Interface Specification (DOCSIS).

APs 202 may employ wireless standards (e.g., WiFi), such the IEEE 802.11 family of standards for transmitting and receiving data. One or more of APs 202 may include the function of a router. For example, one or more of APs 202 may receive data (e.g., a packet) on one port and may forward the received data on another port in the direction of the destination of the data. For example, an AP 202 may receive a packet from UE device 110 and may forward the packet to ONT 206. Likewise, AP 202 may receive a packet from UE device 110 and forward the packet to a different device, such as a different user equipment device. One or more of APs 202 may also include a switch, a hub, a firewall, etc.

As noted above, consumer premises 250 may additionally or alternatively receive Internet service, access to core network 140, television access, and/or telephone service using technologies other than those provided by ONT 206. For example, consumer premises 250 may receive these services through modem 208. Modem 208 may transmit and receive data using a coaxial cable and a standard such as DOCSIS. Modem 208 may provide customer premises 250 with Internet access through a connection (not shown) to core network 140, television access, telephone service, etc. For example, modem 208 may receive data from any device in customer premises 250 and transmit the data toward other devices, such as network devices 150 in core network 140.

As shown in FIG. 2, UE device 110-1 may use an access link A2 to connect to wireless station 120-1, an access link 207 to connect to AP 202-1, an access link 209 to connect to AP 202-2, and/or an access link 211 to connect to AP 202-3. In turn, to connect to modem 208, AP 202-2 may use link 216, AP 202-1 may use link 217, and AP 202-3 may use link 215.

The exemplary configuration illustrated in FIG. 2 is provided for simplicity. Environment 200 may include more or fewer devices than illustrated in FIG. 2. For example, environment 200 may include a large number (e.g., hundreds or more) of UE devices 110, APs 202, and/or ONTs 206. In addition, environment 200 may include additional elements, such as switches, gateways, routers, monitoring devices, etc., that aid in routing data to/from UE devices 110.

Figure 3:
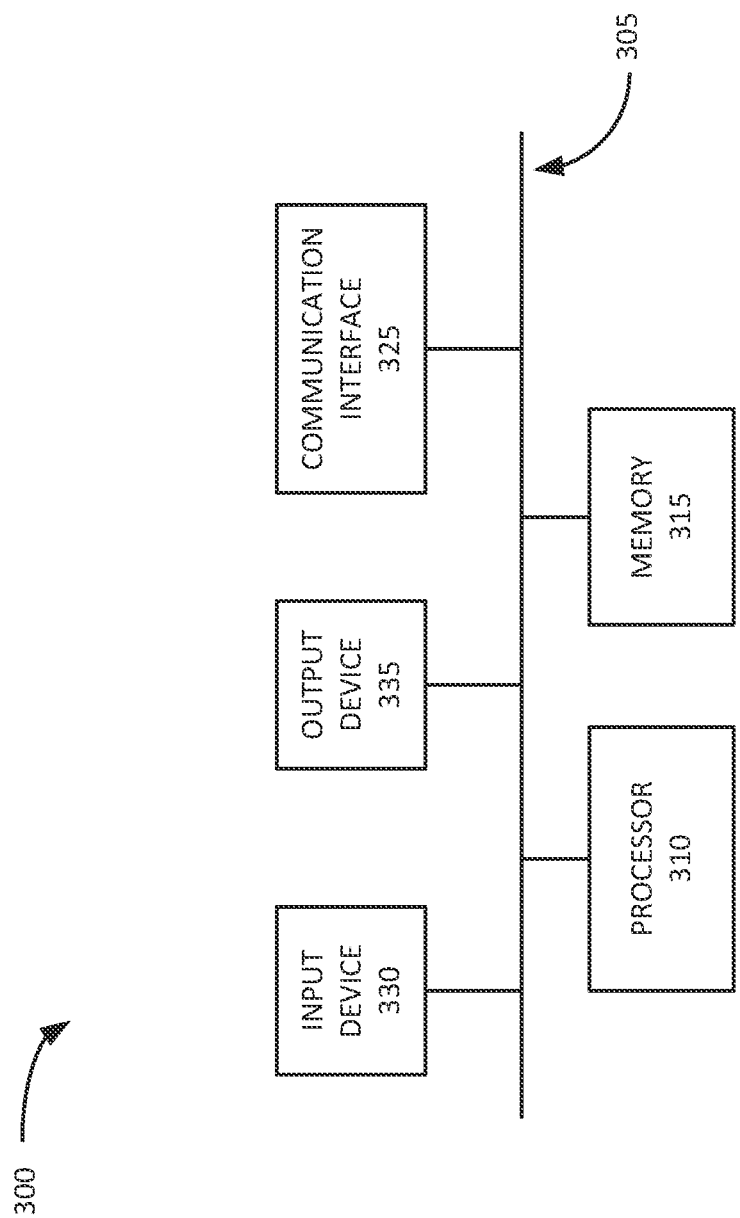
FIG. 3 is a block diagram of exemplary components of one or more devices of FIG. 1 or FIG. 2.

FIG. 3 is a diagram illustrating example components of a device 300 (e.g., a computing device) according to an implementation described herein. UE device 110, wireless station 120, IAB anchor 130, network devices 150, modem 208, and/or AP 202 may each include or be instantiated on one or more devices 300. As illustrated in FIG. 3, device 300 may include a bus 305, a processor 310, a memory 310, a communication interface 325, an input device 330, and/or an output device 335. According to other embodiments, device 300 may include fewer components, additional components, different components, or a different arrangement of components than those illustrated in FIG. 3 and described herein.

Bus 305 includes a path that permits communication among the components of device 300. For example, bus 305 may include a system bus, an address bus, a data bus, and/or a control bus. Bus 305 may also include bus drivers, bus arbiters, bus interfaces, and/or clocks.

Processor 310 includes one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, and/or some other type of component that interprets and/or executes instructions and/or data. Processor 310 may be implemented as hardware (e.g., a microprocessor), a combination of hardware and software (e.g., a SoC, and/or an ASIC), may include one or multiple memories (e.g., cache, etc.), etc. Processor 310 may be a dedicated component or a non-dedicated component (e.g., a shared resource).

Processor 310 may control the overall operation, or a portion of operation(s), performed by device 300. Processor 310 may perform one or multiple operations based on an operating system and/or applications or computer programs (e.g., software 320). Processor 310 may access instructions from memory 315, from other components of device 300, and/or from a source external to device 300 (e.g., a network, another device, etc.). Processor 310 may perform an operation and/or a process based on techniques including, for example, multithreading, parallel processing, pipelining, interleaving, etc.

Memory 315 includes one or multiple memories or other types of storage media. For example, memory 315 may include random access memory (RAM), dynamic random access memory (DRAM), cache, read only memory (ROM), a programmable read only memory (PROM), a static random access memory (SRAM), a single in-line memory module (SIMM), a dual in-line memory module (DIMM), a flash memory (e.g., a NAND flash, a NOR flash, etc.), and/or some other type of memory. Memory 315 may include a hard disk (e.g., a magnetic disk, an optical disk, a magneto-optic disk, a solid state disk, etc.), a Micro-Electromechanical System (MEMS)-based storage medium, and/or a nano-technology-based storage medium. Memory 315 may include a drive for reading from and writing to the storage medium. Memory 315 may be external to and/or removable from device 300, such as, for example, a Universal Serial Bus (USB) memory stick, a dongle, a hard disk, mass storage, off-line storage, network attached storage (NAS), or some other type of storing medium (e.g., a compact disk (CD), a digital versatile disk (DVD), a Blu-Ray disk (BD), etc.). Memory 315 may store data, software, and/or instructions related to the operation of device 300. Memory 315 may be referred to as storage. Memory 315 may store software that includes an application or a program that provides a function and/or a process. For example, the software may include an operating system and an application ("app"). The term "software" is also intended to include firmware, middleware, microcode, hardware description language (HDL), and/or other forms of instruction.

Communication interface 325 permits device 300 to communicate with other devices, networks, systems, devices, and/or the like. Communication interface 325 includes one or multiple wireless interfaces and/or wired interfaces. For example, communication interface 325 may include one or multiple transmitters and receivers, or transceivers. Communication interface 325 may include one or more antennas (e.g., an array of antennas). Communication interface 325 may operate according to a communication standard and/or protocols. Communication interface 325 may include processing logic or circuitry (e.g., multiplexing/demultiplexing, filtering, amplifying, converting, error correction, etc.).

Input device 330 permits an input into device 300. For example, input device 330 may include a keyboard, a mouse, a display, a button, a switch, an input port, speech recognition logic, a biometric mechanism, a microphone, a visual and/or audio capturing device (e.g., a camera, etc.), and/or some other type of visual, auditory, tactile, etc., input component. Output device 335 permits an output from device 300. For example, output device 335 may include a speaker, a display, a light, an output port, and/or some other type of visual, auditory, tactile, etc., output component. According to some embodiments, input device 330 and/or output device 335 may be a device that is attachable to and removable from device 300.

Device 300 may perform a process and/or a function, as described herein, in response to processor 310 executing software 320 stored by memory 315. Instructions may be read into memory 315 from another memory 315 (not shown) or read from another device (not shown) via communication interface 325. The instructions stored by memory 315 cause processor 310 to perform a process described herein. Alternatively, for example, according to other implementations, device 300 performs a process described herein based on the execution of hardware (processor 310, etc.).

Figure 4:
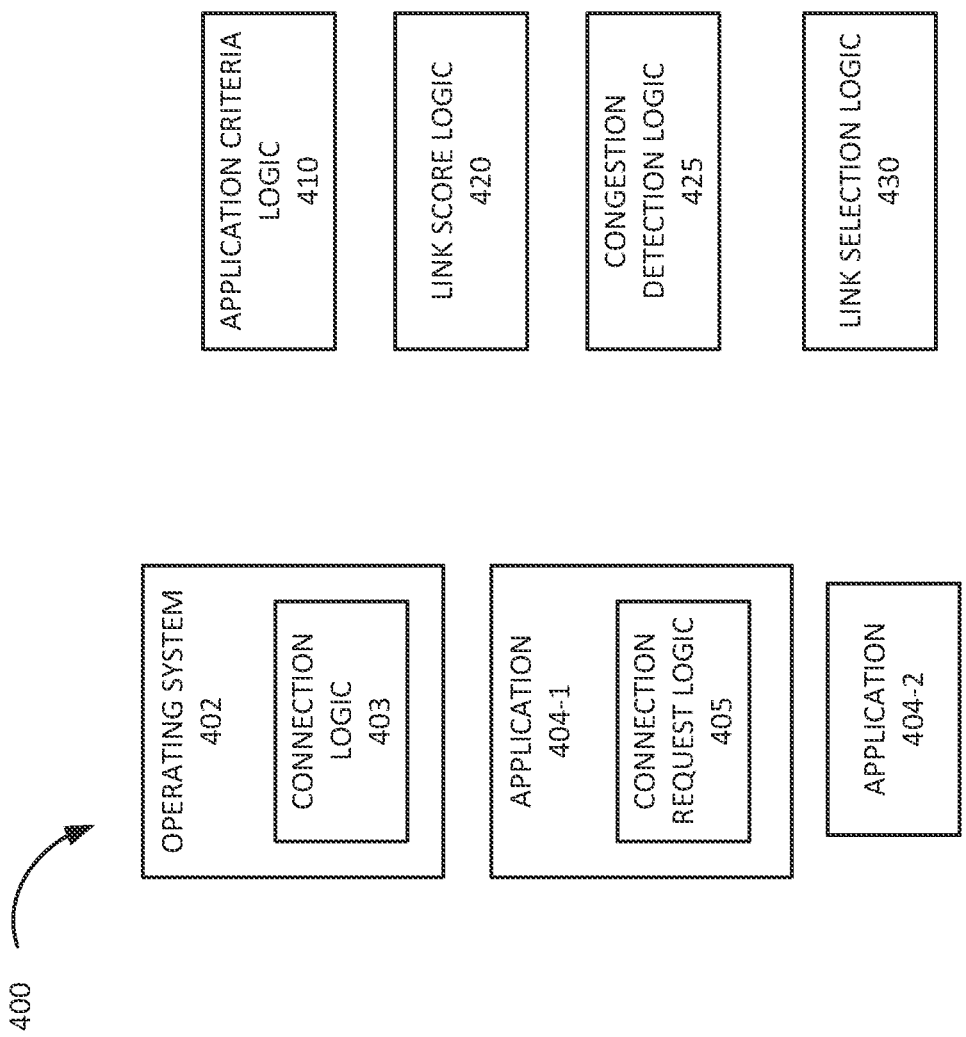
FIG. 4 is a block diagram of exemplary functional components of one or more devices of FIG. 1 or FIG. 2.

FIG. 4 is a block diagram of functional components of a device 400, also referred to as module 400. In an exemplary implementation, module 400 may monitor, analyze, and determine performance variables, such as throughput, latency, and/or signal strength for access links in environment 100. Module 400 may also select, set up, and establish connections between devices in environment 100. Module 400 includes operating system (OS) 402, applications 404-1 and 404-2 (singularly "application 404," collectively "applications 404"), application criteria logic 410 (or "criteria logic 410"), link score logic 420, congestion detection logic 425, and link selection logic 430. OS 402 may include connection logic 403 and application 404-1 may include connection request logic 405. Module 400 may be implemented by processor 310 executing instructions stored in memory 315 of UE device 110 and/or in a distributed manner among devices in environment 100 (e.g., core network 140, network devices 150, and/or wireless station 120).

OS 402 may include software instructions for managing hardware and software resources of functional components 400. For example, OS 402 may include Windows, Linux, Solaris, OS X, Unix, iOS, Android, and/or an embedded operating system. OS 402 may implement a protocol or network stack to send and receive packets over different network types, such as the networks described above in environments 100 and 200. For example, the protocol or network stack may include an internet protocol (IP) stack. OS 402 may host applications, such as application 404. OS 402 may use the network stack to provide connections from applications 404 in UE device 110 to other devices, such as network devices 150. In one embodiment, connection request logic 405 (e.g., as part of application 404) may send requests for connections to connection logic 403.

Connection logic 403 may include software instructions for survey and determine network access links from UE device 110 to, for example, core network 140. Connection logic 403 may also select which access link to for an application by determining which access link best meets criteria. In one embodiment, connection logic 403 includes criteria logic 410, score logic 420, congestion logic 425, and/or link selection logic 430.

Application 404 may include an application that runs on mobile devices or fixed devices. For example, application 404 may include an email client app (e.g., Gmail app or Outlook), a video-streaming app (e.g., Netflix), a messaging app (e.g., WhatsApp, Signal Messenger, etc.), a video conferencing app (e.g. Zoom, Signal, Facetime, etc.). In one embodiment, application 404 may include connection request logic 405 for sending requests to OS 402 to establish connections to other devices, such as network devices 150 in core network 140. In this embodiment, the request may include criteria for the connection, such as the desired latency, throughput, and/or jitter.

Application criteria logic 410 may identify criteria desired by application 404 (e.g., running in UE device 110) for an access link. For example, application criteria logic 410 may determine that application 404 is an email client, a streaming video application, and/or a messaging application. In one embodiment, criteria logic 410 may make this determination by inferring the type of application based on traffic patterns or determining the IP address to which application 404 connects. In another embodiment, application 404 may identify itself to criteria logic 410 with specific criteria requests for a connection. Criteria logic 410 may determine criteria such as: requiring a low latency or not; requiring a high throughput or not; and/or requiring a low jitter or not. For example, criteria logic 410 may identify a video-streaming application (e.g., Netflix or YouTube) as requiring high throughput without low latency. As another example, criteria logic 410 may identify a messaging application (e.g., Signal Messenger) as requiring low latency with low throughput. Criteria logic 410 may also identify the direction of throughput, such as requiring a high throughput from core network 140 to UE device 110 but a low throughput from UE device 110 to core network 140.

In some embodiments, criteria logic 410 may also determine whether a UE device 110 has a service level agreement (SLA) or quality of service (QoS) agreement (e.g., an agreement with the service provider associated with IAB anchor 130 and core network 140). In such implementations, criteria logic 410 may assign all applications for UE device 110 having an SLA or QoS agreement with the service provider as requiring a certain set of criteria. In this manner, a subscriber associated with UE device 110 may obtain faster service with less delay, jitter, etc., when executing applications.

Link score logic 420 may determine a score associated with a network access link from UE device 110 to another device (e.g., wireless station 120). For example, link score logic 420 may determine the throughput, delay, and/or jitter of an access link. For example, score logic 420 may determine the signal-to-noise ratio (SNR) for network access links (e.g., access links A1-A4 or access link 207, 209, or 211). In this example, the SNR may be indicative of or used to determine throughput. In some implementations, link score logic 420 may determine whether the SNR and/or throughput is greater than or equal to a threshold value. For example, link score logic 420 may define SNRmin_R for real-time traffic and SNRmin_NR for non-real-time traffic. As discussed in more detail below, if the SNR for a link is below the minimum SNR threshold (e.g., SNRmin_R or SNRmin_NR), data transmission on the link may not be possible and/or be of poor quality. As an example, the minimum SNR for voice communications may be 25 decibels (dB), and the minimum SNR for data may be 18 dB.

In other implementations, link score logic 420 may use metrics other than SNR to measure or detect channel quality. For example, link score logic 420 may use a channel quality indicator (CQI) value, a signal-to-interference-plus-noise ratio (SINR) value, a block error rate (BLER) value, a Received Signal Strength Indication (RSSI) value, a Reference Signal Received Quality (RSRQ) value, a Reference Signal Received Power (RSRP) value, and/or using another measure of signal strength or quality. In each case, link score logic 420 may determine a channel quality metric associated with the signal quality of a particular link or channel.

Congestion detection logic 425 may include software or logic to detect the congestion for an access link. For example, congestion logic 425 may check the congestion level of AP 202 before selecting the access link for use. In this example, the SNR may be indicative of or used to determine throughput. A congested access link may cause delays and even dropped packets. In an exemplary implementation, the congestion level may be estimated by analyzing the throughput level.

Link selection logic 430 may include software or logic devices to identify possible network access links to choose from (e.g., to link UE device 110 to core network 140). Link selection logic 430 may also select the network access link for UE device 110 to use to communicate with core network 140. For example, link selection logic 430 may determine that UE device 110-1 has many network access links to choose from, one being a path via wireless link A1 (FIG. 1); the second being link A2 to wireless station 120-1 (FIGS. 1 and 2), link 205 to ONT 206 (FIG. 2), link 207 to AP 202-1 (FIG. 2), link 209 to AP 202-2 (FIG. 2), and/or link 211 to AP 202-3 (FIG. 2). UE device 110-2 may have two access links: the first being a path via wireless link A3 (FIG. 1); and the second path being via link A4 to wireless station 120-3 (FIG. 1). In one implementation, link selection logic 430 may store the network access links during configuration or may identify the network access links in real time when a UE device 110 is attempting to connect to, for example, core network 140.

Although FIG. 4 shows exemplary components of module 400, in other implementations, module 400 may include fewer components, different components, differently arranged components, or additional components than depicted in FIG. 4. For example, module 400 and/or OS 402 may include location logic to determine the current location of UE device 110 (e.g., a global positioning system or GPS). In this example, the location logic may provide the current location to link selection logic 430, score logic 420, and/or connection logic 403 to determine and select network access links. In addition, in some implementations, functions described as being performed by module 400 may be performed by other devices located externally with respect to module 400.

Figure 5:
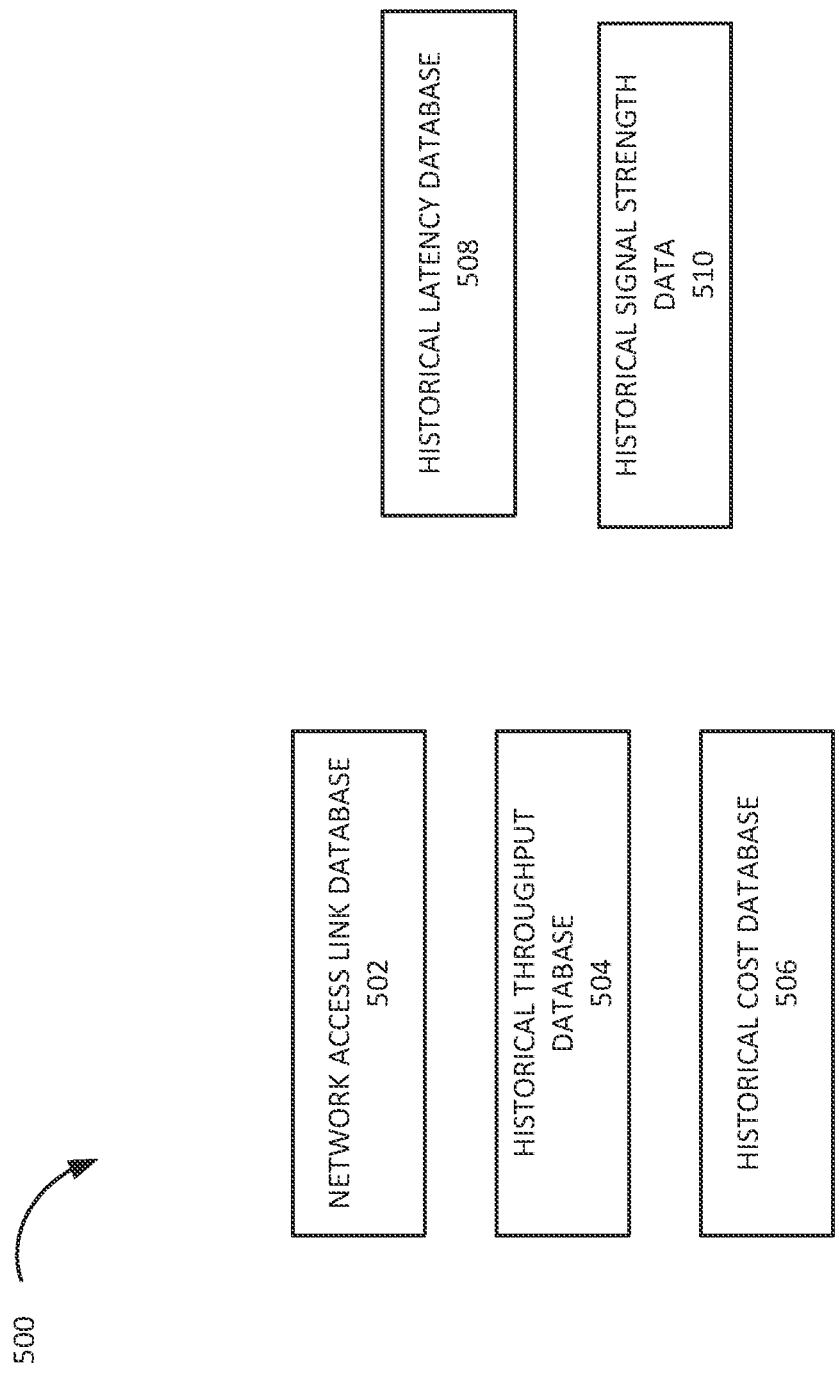
FIG. 5 is a block diagram of exemplary informational components of one or more devices of FIG. 1 or FIG. 2.

FIG. 5 is a block diagram of information stored in device 500, also referred to as module 500. In some implementations, device 500 may be the same device as device 400 shown in FIG. 4. The information may include a network access database 502, a historical throughput DB 504, a historical cost database 506, and a historical latency database 508. This information shown in FIG. 5 may be stored in memory 315 of UE device 110. In other implementations, module 500 may be implemented externally with respect to UE device 110, such as in core network 140, network devices 150, and/or wireless station 120.

Access link DB 502 stores information related to network access links available to UE device 110. For example, referring to FIG. 1 and FIG. 2, access link DB 502 may store a list of network access links available to UE device 110-1. As such, the list may include the identities of the following network access links: link A1 (FIG. 1) to IAB anchor 130; link A2 to wireless station 120-1 (FIGS. 1 and 2); link 205 to ONT 206 (FIG. 2); link 207 to AP 202-1 (FIG. 2); link 209 to AP 202-2 (FIG. 2); and link 211 to AP 202-3 (FIG. 2).

Throughput DB 504 stores historical data related to throughput, such as a table with throughput as a function of time (e.g., day of the week, time of year, and/or time of day). For example, throughput DB 504 may indicate that access link A2 to/from wireless station 120-1 may transmit and/or receive approximately 25 Mbps to/from UE device 110-1 on a Wednesday at 1 pm. Throughput DB 504 may also indicate that access link A2 to/from wireless station 120-1 may transmit/receive approximately 5 Mbps to/from UE device 110-1 on a Friday at 6 pm.

Cost DB 506 may store historical data related to resource cost. For example, cost DB 506 may store a table that indicates that the resource cost of accessing wireless station 120-1 over link A2 costs in resource usage, the equivalent of $0.10 per gigabit at any time. Cost DB 506 may also indicate that the cost of accessing core network 140 through ONT 206 may be free at any time.

Latency DB 508 may store historical data related to latency, such as a table that indicates that the latency associated with accessing core network 140 as a function of time (e.g., day of the week, time of year, and/or time of day). For example, latency DB 508 may indicate that the latency associated with wireless station 120-1 to core network 140 is 10 ms on Wednesday at 1 pm, 40 ms on Friday at 6 pm, etc.

Signal strength DB 510 may store historical data related to signal strength (e.g., RSSI), such as a table that indicates the signal strength associated with a wireless signal. In one embodiment, the signal strength may be associated with a location of UE device 110. For example, signal strength DB 510 may indicate that the signal strength associated with wireless station 120-1 is −97 dBm at customer premises 250.

Although FIG. 5 shows exemplary components of module 500, in other implementations, module 500 may include fewer components, different components, differently arranged components, or additional components than depicted in FIG. 5. For example, module 500 may store information related to historical congestion data, and/or historical SNR data. As another example, module 500 may store block lists and access lists that identify applications that are or are not permitted to use particular types of network access links. For example, a block list may identify a video streaming application as an application that is not permitted to use a metered network access link (e.g., a cellular access link). In addition, in some implementations, functions described as being performed by module 500 may be performed by other devices located externally with respect to module 500.

Figure 6:
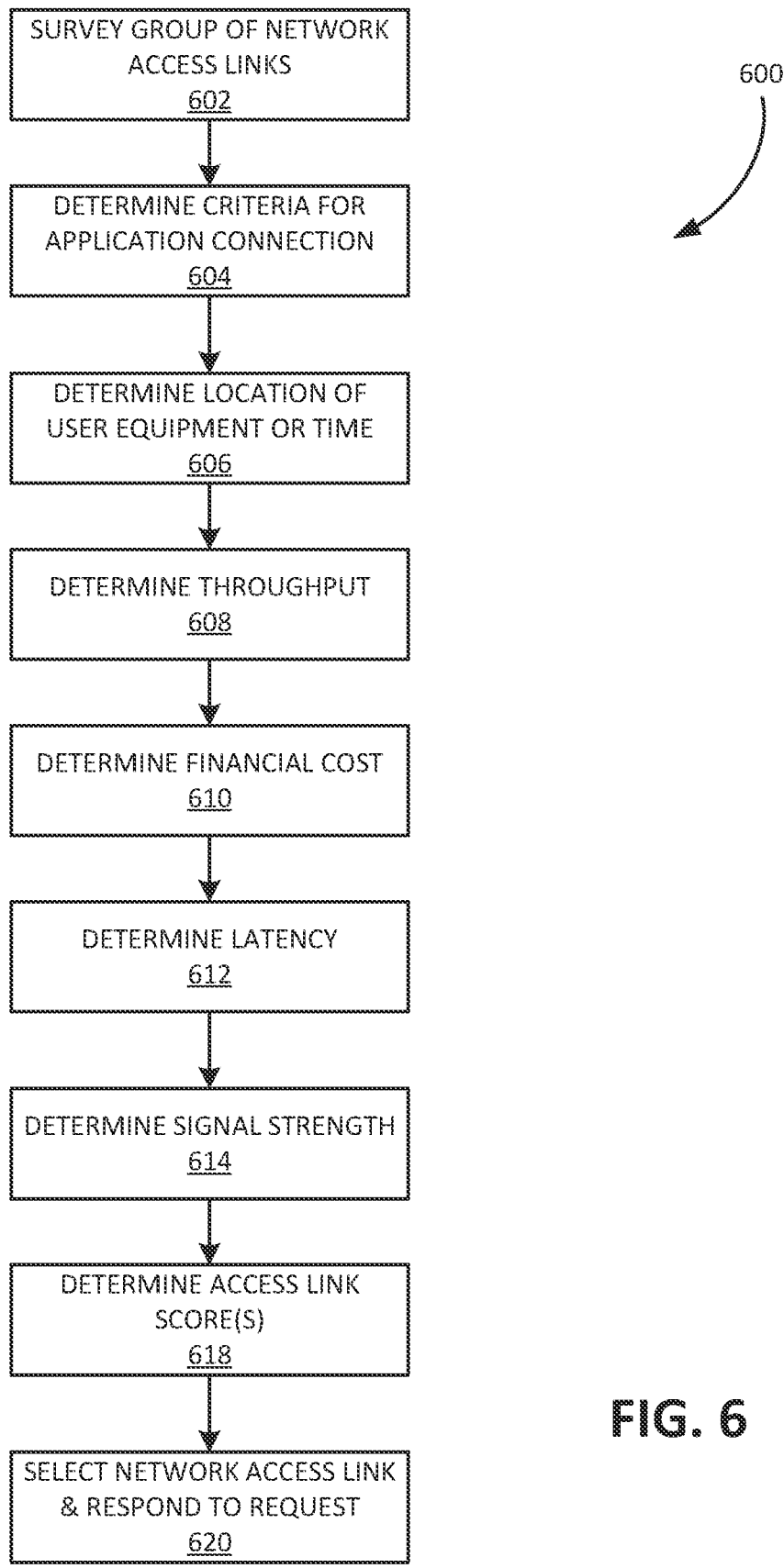
FIG. 6 is a flowchart illustrating an exemplary process for optimizing user equipment access to a network.

FIG. 6 is a flowchart of a process 600 for selecting a network access link for UE device 110 to access a network. Process 600 may be implemented as software instructions stored in memory 315 that are executed by processor 310 (e.g., by one or more of the devices described herein). For example, instructions for process 600 may be stored in memory 315 in UE device 110 and may run on processor 210 in UE device 110. Multiple instances of process 600 may run at the same time. For example, application 404-1 and application 404-2 may both be establishing and using network access links to core network 140 at the same time (e.g., simultaneously). In addition, application 404-1 and application 404-2 may also each use separate network access link to core network 140 at the same time (e.g., simultaneously).

Process 600 may begin with receiving a request for a connection and determining (e.g., surveying for) a group of network access links associated with UE device 110 (block 602). For example, connection logic 403 may receive a request from connection request logic 405 for a connection to a server in core network 140. Connection logic 403 may employ link selection logic 430 to determine that UE device 110 is associated with the following access links: access link 205 between UE device 110-1 and ONT 206 (FIG. 2); access link A1 between UE device 110-1 and wireless station 120-1 (FIGS. 1 and 2); and access link 207 between UE device 110-1 and AP 202-1 (FIG. 2); and access link 209 between UE device 110-1 and AP point 202-2 (FIG. 2). Access links may be identified by connection logic 403 and/or link selection logic 430 and stored in access link DB 502. In one embodiment, connection logic 403 and/or link selection logic 430 may determine the identities of network access links on a periodic basis or when requested by connection request logic 405, for example. In one embodiment, link selection logic 430 may exclude network access links that, as identified in a block lists, that are or are not permitted to use particular types of network access links. For example, a block list may identify a video streaming application as an application that is not permitted to use a metered network access link (e.g., a cellular access link).

Process 600 may continue with the determination of one or more criteria associated with a request to access a network (block 604). Criteria logic 410 may determine one or more criteria for selecting an appropriate access link. The criteria may include a desired throughput, latency, financial cost, and/or signal strength, for example. The criteria may be associated with application 402 running in UE device 110. Criteria logic 410 may determine the criteria in response to a request to access a network (e.g., a request from connection request logic 405 to connection logic 403). For example, if application 402 is a game, then criteria logic 410 may determine one of the criteria to include a low latency (e.g., the timing of the user's input may be critical for game play depending on the game). In this example, criteria logic 410 may also determine one of the criteria to include a low throughput because only a small amount of data is transmitted from application 402 (e.g., a game with limited data transmission). On the other hand, if application 402 is a video streaming service (e.g., YouTube or Netflix), then the criteria may be high throughput without any particular latency requirement (e.g., a high latency specified as a criterion). Criteria logic 410 may also receive criteria in a request for a connection to core network 140. For example, a video streaming application may specify in a request that the criteria is high throughput without regard to latency (or may specify a high latency).

To determine the one or more criteria (block 604), criteria logic 410 may also determine whether a UE device 110 has an SLA or QoS agreement (e.g., an agreement with the service provider associated with IAB anchor 130 and core network 140). In this case, criteria logic 410 may assign a requesting application 404 as requiring a certain set of criteria.

Score logic 420 may determine and/or score each network access link (e.g., against the criteria determined in block 604). Score logic 420 may determine the latency, throughput, financial cost, location, and/or signal strength of each network access link, for example. Score logic 420 may generate a score based on, for example, the determined latency, throughput, financial cost, location, and/or signal strength of each network access link. Determining the score may include determining the location of UE device 110 (block 606); determining the throughput of each network access link (block 608); determining the resource cost associated with the network access link (block 610); determining the latency of each network access link (block 612); and/or determining the signal strength of each network access link (block 614). In another embodiment, an overall score may be determined based on the individual scores determined in blocks 606-614.

In one embodiment, score logic 420 may score each network access link based on historical data. In this embodiment, score logic 420 may determine the time and/or location of UE device 110 (block 606). Score logic 420 may look up historical data associated with UE device 110-1 in environment 200 at the current time. For example, score logic 420 may determine that UE device 1100-1 is in customer premises 250 on a Friday at 6 p.m. Score logic 420 may query throughput DB 504, cost DB 506, latency DB 508, and/or signal strength DB 510 to determine the historical throughput, cost, latency, and signal strength at that time at that location. Score logic 420 may determine the score (block 618) based on, for example, the latency, throughput, financial cost, location, and/or signal strength.

In one embodiment, the throughput of each of the network access links is determined (block 608) by sending data (e.g., test data) to network devices 150 to measure the throughput. As noted, the throughput may also or alternatively be an estimate (e.g., based on historical measurements) or based on a measurement (e.g., a recent or contemporaneous measurement). For example, score logic 420 may query throughput DB 504 (based on time and/or location) to determine the expected throughput for network access links determined in block 602. Determining the throughput of a network access link based on historical data may be considered predicting the throughput (e.g., as opposed to measuring the throughput directly). In one embodiment, congestion detection logic 425 may help determine the congestion and therefore the throughput for an access link. For example, congestion logic 425 may check the congestion level of AP 202-1. In this example, congestion logic 425 may determine throughput based at least in part on the SNR.

The financial cost of each of the network access links may be determined (block 610). For example, score logic 420 may determine that the financial cost is zero if a link to access a network is not metered. On the other hand, score logic 420 may determine that the financial cost is expected to be $1 if a link to access a network is metered. An example of a metered network is a link that charges per byte carried by the link, such as $10 per gigabit. An example of a non-metered network is a link that charges per month regardless of usage. The financial cost may also or alternatively be an estimate (e.g., based on historical data) or based on stored service contract information. For example, score logic 420 may query cost DB 506 (based on time and/or location) to determine the expected cost for network access links determined in block 602. Determining the financial of a network access link based on historical data may be considered predicting the financial cost (e.g., as opposed to determining it based on contractual information).

The latency of one or more of the plurality of access links may be determined (block 612). For example, score logic 420 may send data (e.g., test data) to and from network devices 150 to measure the throughput. The latency may be an estimate (e.g., based on historical measurements) or based on a measurement (e.g., a recent or contemporaneous measurement). For example, score logic 420 may query latency DB 508 (based on time and/or location) to determine the expected latency for network access links determined in block 602. Determining the latency of a network access link based on historical data may be considered predicting the latency (e.g., as opposed to measuring the latency directly by measurement).

The signal strength of each of the network access links may be determined (block 614). For example, score logic 420 may query OS 402 to determine the signal strength of different wireless network connections, such as via AP 202-1 (link 207), AP 202-2 (link 209), AP 202-3 (link 211), and/or wireless station 120-1 (link A2). The signal strength may be an estimate (e.g., an estimate based on historical measurements) or a measurement (e.g., a recent measurement). In one embodiment, score logic 420 may query signal strength DB 510 (based on time and/or location) to determine the expected signal strength for network access links determined in block 602. Determining the signal strength of a network access link based on historical data may be considered predicting the signal strength (e.g., as opposed to measuring it directly).

In one embodiment, score logic 420 may determine a composite score (block 618) based on one or more of the determined factors such as, for example, the latency, throughput, financial cost, location, and/or signal strength (e.g., determined in blocks 608-614). In one embodiment, some scores may be based on end-to-end considerations and not just the link to the next network device. For example, the score related to latency may include the latency from UE device 110-1 to wireless station 120-1 (link A2), the latency from wireless station 120-1 to wireless station 120-2 (link B1), the latency from wireless station 120-2 to IAB anchor 130, and from IAB anchor 130 to core network 140 (link 160). In this respect, connection logic 403 and/or connection request logic 405 may request information from environment 100 and may determine a total latency based on expected latency of each hop in environment 100. In one embodiment, connection logic 403 may determine a total expected latency using a combinatorial optimization algorithm, such as an adapted Dijkstra algorithm.

One of the links in the group of links may be selected for UE device 110 (e.g., the application running in UE device 110) to use (block 620). Link selection logic 430 may select the network access link based on a comparison of the criteria to the score. Link selection logic 430 may select the network access link that best meets the criteria. For example, link selection logic 430 may select one of the following links: access link 205 between UE device 110-1 and ONT 206 (FIG. 2); access link A1 between UE device 110-1 and wireless station 120-1 (FIGS. 1 and 2); and access link 207 between UE device 110-1 and AP 202-1 (FIG. 2); and access link 209 between UE device 110-1 and AP point 202-2 (FIG. 2). In one embodiment, connection logic 403 responds to connection request logic 405 in application 404 with an identification of the connection so that application 404. In this embodiment, to use the connection, application 404 identifies the connection.

In one embodiment, different applications 404 in the same UE device 110 may use different network access links to core network 140, for example. Thus, a game running in UE device 110 may use a different network access link (e.g., with a first set of criteria) than a video streaming application (e.g., with a second set of criteria). In this case, the respective application (e.g., either application 404-1 or application 404-2) may identify the connection to OS 402 when sending or receiving data. In another embodiment, OS 402 may send data from an application through the network access link based on the application. That is, OS 402 may use link 205 for one application and link 207 for a different connection.

In some implementations, a single application may use multiple separate connections for different needs (e.g., one connection for low latency needs, another connection for throughput). That is, one application may use two different network access links at the same time (e.g., simultaneously). For example, one application 404 in the same UE device 110 may use different network access links to core network 140 for different needs or functions. Thus, a game running in UE device 110 may use a different network access links (e.g., with a first set of criteria) for sending user input and a different network access link (with a second set of criteria) for receiving detailed scenery information. In this case, the function may identify the connection to OS 402 when sending or receiving data.

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while a series of blocks have been described with respect to FIG. 6, and a series of signal flows/messages have been described, the order of the blocks and/or signal flows may be modified in other implementations. Further, non-dependent blocks may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

The terms "comprises" and "comprising" when used in this specification are taken to specify the presence of stated features, integers, steps or components but does not preclude the presence or addition of one or more other features, integers, steps, components or groups thereof. The term "logic," as used herein, may refer to a combination of one or more processors configured to execute instructions stored in one or more memory devices, may refer to hardwired circuitry, and/or may refer to a combination thereof. Furthermore, a logic may be included in a single device or may be distributed across multiple, and possibly remote, devices. The term "substantially" is used herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

To the extent the aforementioned embodiments collect, store, or employ personal information of individuals, it should be understood that such information shall be collected, stored, and used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information. No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

The invention claimed is:

1. A method comprising:
   determining, by a user equipment (UE) device, a plurality of network access links associated with the UE device;
   determining, by the UE device, a first set of one or more criteria associated with a first request to access a network and a second set of one or more criteria associated with a second request to access the network, wherein the first set and the second set of one or more criteria are different from each other and wherein the first set and the second set of one or more criteria include throughput, resource cost, latency, or signal strength;
   determining, by the UE device, a score for each of the plurality of network access links with respect to the first set and the second set of one or more criteria, wherein the score is based on historical data related to the first set and the second set of one or more criteria;
   comparing, by the UE device, the score for each of the plurality of network access links with the first set of one or more criteria associated with the first request to access the network;
   comparing, by the UE device, the score for each of the plurality of network access links with the second set of one or more criteria associated with the second request to access the network;
   selecting, by the UE device and based on the comparing, a first one of the plurality of network access links; and
   selecting, by the UE device and based on the comparing, a second one of the plurality of network access links,
   wherein the first one of the plurality of network access links is for a first application to use to communicate with the network and the second one of the plurality of network access links is for a second application to use to communicate with the network and wherein the first application and the second application run on a same UE device; or
   wherein the first one of the plurality of network access links is for a first function of the first application to use to communicate with the network and the second one of the plurality of network access links is for a second function of the first application to use to communicate with the network.

2. The method of claim 1, wherein the first one of the plurality of network access links is for a first application to use to communicate with the network and the second one of the plurality of network access links is for a second application to use to communicate with the network and wherein the first application and the second application run on the same UE device.

3. The method of claim 2, further comprising:
   receiving, from the first application, the first request to access the network, wherein the first request includes the first set of one or more criteria; and
   receiving, from the second application, the second request to access the network, wherein the second request includes the second set of one or more criteria.

4. The method of claim 2,
   wherein the first application accesses the network using the first one of the plurality of network access links; and
   wherein the second application accesses the network using the second one of the plurality of network access links at a same time that the first application accesses the network using the first one of the plurality of network access links.

5. The method of claim 1, further comprising:
   sending, to the first application, an identification of the first one of the plurality of network access links selected based on the comparing.

6. The method of claim 1, further comprising:
   determining a current location of the UE device and determining a current time; and
   predicting the score based on the current location and the current time.

7. The method of claim 1, wherein determining the one or more criteria includes determining criteria specified in a quality-of-service agreement or service-level agreement.

8. The method of claim 1, further comprising:
   receiving, from the first application, the first request to access the network, wherein the first request includes the first set of one or more criteria.

9. The method of claim 8, wherein the UE device includes an operating system, wherein receiving the first request to access the network includes:
   receiving the first request in the operating system from the first application, wherein the first request includes the first set of one or more criteria.

10. The method of claim 1, wherein the first one of the plurality of network access links is for a first function of the first application to use to communicate with the network and the second one of the plurality of network access links is for a second function of the first application to use to communicate with the network.

11. A user equipment (UE) device comprising:
    a transceiver to send and receive data through a plurality of network access links associated with the UE device; and
    a processor configured to:
       determine a first set of one or more criteria associated with a first request to access a network and a second set of one or more criteria associated with a second request to access the network, wherein the first set and the second set of one or more criteria are different from each other and wherein the first set and the second set of one or more criteria include throughput, resource cost, latency, or signal strength;
       determine a score for each of the plurality of network access links with respect to the first set and the second set of one or more criteria, wherein the score is based on historical data related to the first set and the second set of one or more criteria;

compare the score for each of the plurality of network access links with the first set of one or more criteria associated with the first request to access the network;

compare the score for each of the plurality of network access links with the second set of one or more criteria associated with the second request to access the network;

select, based on the comparing, a first one of the plurality of network access links; and select, based on the comparing, a second one of the plurality of network access links, wherein the first one of the plurality of network access links is for a first application to use to communicate with the network and the second one of the plurality of network access links is for a second application to use to communicate with the network and wherein the first application and the second application run on a same UE device; or wherein the first one of the plurality of network access links is for a first function of the first application to use to communicate with the network and the second one of the plurality of network access links is for a second function of the first application to use to communicate with the network.

12. The UE device of claim 11, wherein the first one of the plurality of network access links is for a first application to use to communicate with the network and the second one of the plurality of network access links is for a second application to use to communicate with the network and wherein the first application and the second application run on the same UE device.

13. The UE device of claim 12, wherein the processor is further configured to:

receive, from the first application, the first request to access the network, wherein the first request includes the first set of one or more criteria; and receive, from the second application, the second request to access the network, wherein the second request includes the second set of one or more criteria.

14. The UE device of claim 12, wherein the first application is configured to access the network using the first one of the plurality of network access links; and wherein the second application is configured to access the network using the second one of the plurality of network access links at the same time that the first application accesses the network using the first one of the plurality of network access links.

15. The UE device of claim 11, wherein the processor is further configured to:

send, to the first application, an identification of the first one of the plurality of network access links selected based on the comparing.

16. The UE device of claim 11, wherein the processor is further configured to:

determine a current location of the UE device and determining a current time; and predict the score based on the current location and the current time.

17. The UE device of claim 11, wherein when determining the one or more criteria the processor is configured to determine criteria specified in a quality-of-service agreement or service-level agreement.

18. The UE device of claim 11, wherein the processor is further configured to:

receive, from the first application, the first request to access the network, wherein the first request includes the first set of one or more criteria.

19. The UE device of claim 18, wherein the UE device includes an operating system, wherein the operating system is configured to receive the first request from the first application, wherein the first request includes the first set of one or more criteria.

20. The UE device of claim 11, wherein the first one of the plurality of network access links is for a first function of the first application to use to communicate with the network and the second one of the plurality of network access links is for a second function of the first application to use to communicate with the network.

* * * * *